United States Patent
Wiley et al.

(10) Patent No.: US 6,594,767 B1
(45) Date of Patent: Jul. 15, 2003

(54) SYSTEM FOR PREVENTING POWER SAVE MODE DURING A PRE-SET CONDITION WHILE TRACKING PATTERNS OF USE IN ORDER TO MODIFY THE PRE-SET CONDITION TO ACCOMMODATE THE PATTERNS OF USE

(75) Inventors: Steve R. Wiley, Boise, ID (US);
Margaret J. Burton, Boise, ID (US);
David M. Payne, Meridian, ID (US);
Tim M. Hoberock, Boise, ID (US);
Michelle E. Evans, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/541,106

(22) Filed: Mar. 31, 2000

(51) Int. Cl.[7] ................................................ G06F 1/26
(52) U.S. Cl. ...................... 713/300; 713/320; 713/321; 713/323
(58) Field of Search ................................ 713/300, 320, 713/321, 323

(56) References Cited

U.S. PATENT DOCUMENTS

| | | | | |
|---|---|---|---|---|
| 5,586,332 A | 12/1996 | Jain et al. | ..................... | 395/750 |
| 5,657,257 A | 8/1997 | Lee | ............................. | 364/707 |
| 5,900,026 A | * 5/1999 | Ryu | ............................. | 713/320 |
| 5,978,923 A | * 11/1999 | Kou | ............................. | 713/323 |
| 6,044,473 A | * 3/2000 | Kim | ............................. | 713/320 |
| 6,384,853 B1 | * 5/2002 | Shaffer et al. | ............... | 345/867 |
| 6,408,395 B1 | * 6/2002 | Sugahara et al. | ............ | 713/310 |

FOREIGN PATENT DOCUMENTS

| | | | | |
|---|---|---|---|---|
| EP | 0735457 A2 | 3/1996 | ............. | G06F/1/32 |
| GB | 2265232 A | 2/1993 | ............. | G06F/1/32 |
| GB | 2290637 A | 6/1994 | ............. | G06F/1/32 |

OTHER PUBLICATIONS

UK Patent Office Search Report.

* cited by examiner

*Primary Examiner*—Thomas Lee
*Assistant Examiner*—Michael Nieves

(57) ABSTRACT

A computer peripheral device is prevented from being in power save mode by either forcing the peripheral device out of power save mode or preventing the peripheral device from entering power save mode. A timing mechanism tracks time. The timing mechanism either tracks the time of day, the day of the week, an elapsed time, or a combination of these times. The time tracked by the timing mechanism is compared to a pre-set condition stored in a storage device. If the time meets the pre-set condition, the computer peripheral device is prevented from being in power save mode. The computer peripheral device is prevented from being in power save mode by either transmitting a job to the peripheral device for processing, accessing the control means of the peripheral device and terminating the power save mode, or temporarily disabling the power save mode for the peripheral device.

22 Claims, 2 Drawing Sheets

SYSTEM FOR PREVENTING POWER SAVE MODE DURING A PRE-SET CONDITION WHILE TRACKING PATTERNS OF USE IN ORDER TO MODIFY THE PRE-SET CONDITION TO ACCOMMODATE THE PATTERNS OF USE

FIELD OF THE INVENTION

This invention relates in general to computing technology and, more particularly, to a computer peripheral device prevented from being in power save mode.

BACKGROUND OF THE INVENTION

In order to minimize power usage during idle periods, modern printers and other computer peripheral devices include a power saving features often referred to as a sleep mode or power save mode. This feature is implemented by a manager with a timer in the device that puts the device into sleep mode after a pre-set idle period.

Many of the devices with the energy saving feature have a very long warm-up period. As a result, the first use of the device after the device has been in sleep mode takes much longer than a use of the device when it has not been in sleep mode.

Additionally, several printers with the energy saving feature perform calibration after exiting sleep mode. This calibration not only takes time to perform, but it also causes wear on the drum and other printing components. If a printer enters and exits the sleep mode several times a day, the life of many of the components of the printer can be reduced by several times over what could be achieved if the printer were to stay out of sleep mode.

SUMMARY OF THE INVENTION

According to principles of the present invention, a computer peripheral device is prevented from being in power save mode. A timing mechanism tracks time. The time is compared to a pre-set condition stored in a storage device. If the time meets the pre-set condition, the computer peripheral device is prevented from being in power save mode.

According to further principles of the present invention, the timing mechanism either tracks the time of day, the day of the week, an elapsed time, or a combination of these times.

According to further principles of the present invention, the computer peripheral device is prevented from being in power save mode by either forcing the peripheral device out of power save mode or preventing the peripheral device from entering power save mode. The computer peripheral device is forced out of power save mode by either transmitting a job to the peripheral device for processing or accessing the control means of the peripheral device and terminating the power save mode. The peripheral device is prevented from entering power save mode by periodically transmitting a job to the peripheral device for processing or temporarily disabling the power save mode for the peripheral device.

Other objects, advantages, and capabilities of the present invention will become more apparent as the description proceeds.

DETAILED DESCRIPTION OF THE INVENTION

Figure 1:
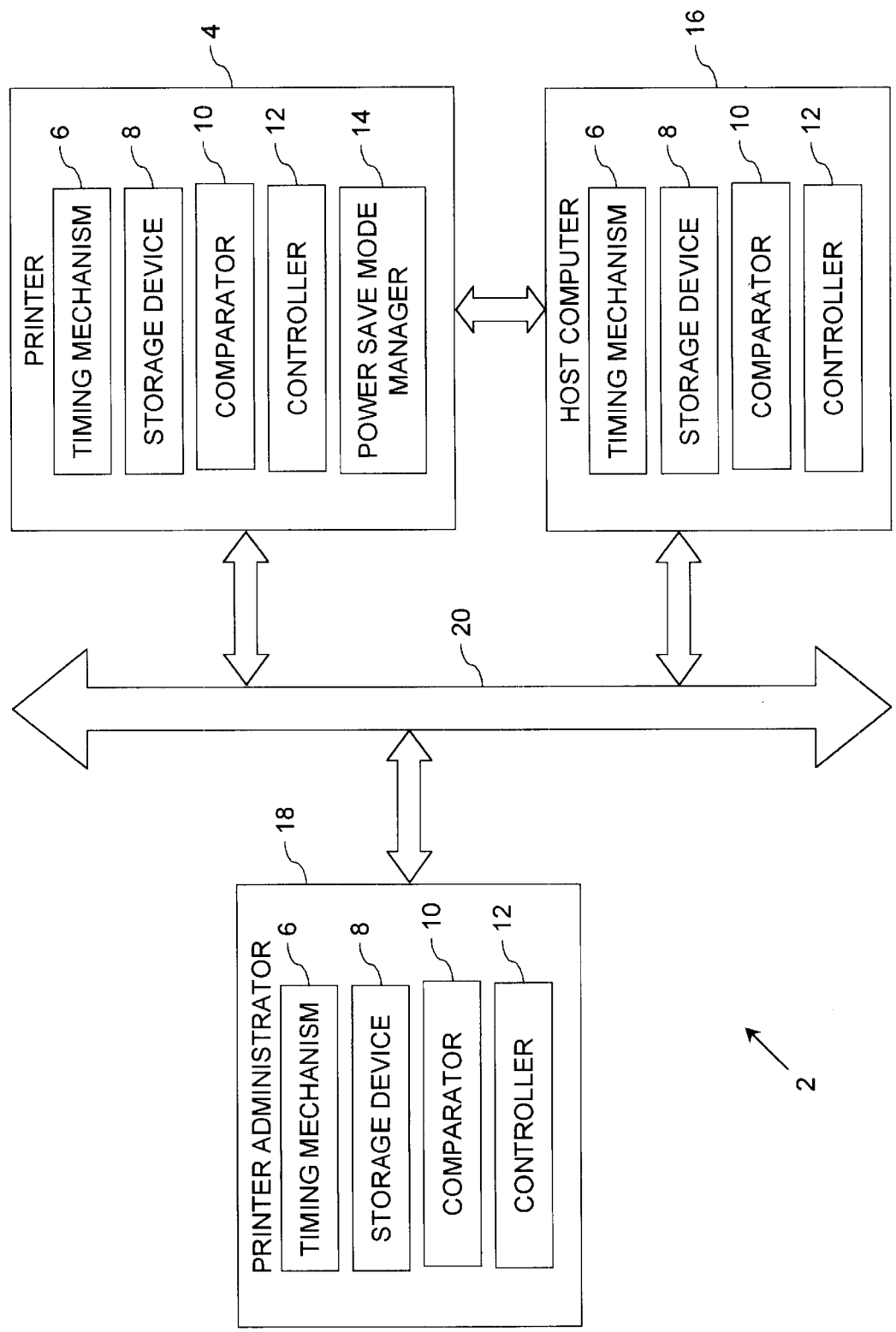
FIG. 1 is a block diagram illustrating various embodiments of the present invention system for preventing a computer peripheral device from being in a power save mode.

Illustrated in FIG. 1 are various embodiments of a system 2 for preventing a computer peripheral device from being in a power save mode. FIG. 1 illustrates the present invention system for a computer peripheral device where the computer peripheral device is a printer. Alternatively, the computer peripheral device may be any computer peripheral device having a power save mode. Power save mode is any power saving mode that uses less power than normal mode. For example, power save mode is either a low power mode or an off mode.

System 2 includes a printer 4, a timing mechanism 6, a storage device 8, a comparator 10, and a controller 12. Printer 4 also includes a power save mode manager 14. Timing mechanism 6, storage device 8, comparator 10, and controller 12 are either within or external to printer 4. External locations for timing mechanism 6, storage device 8, comparator 10, and controller 12 include a host computer 16, or a printer administrator 18.

Power save mode manager 14 is a conventional or modified manager for managing the power save feature of printer 4. Power save mode manager 14 includes a timer for timing the idle time between print jobs for printer 4. When the timer reaches a preselected idle time, power save mode manager 14 will put printer 4 into power save mode. Some conventional power save mode managers also include a means for receiving a wakeup command and forcing the peripheral device out of power save mode responsive to the wakeup command.

Timing mechanism 6 tracks time either as an elapsed time, actual time, or both actual and elapsed time. Elapsed time is the time from one event in any convenient units or combination of units, such as hours, minutes, and seconds. Actual time may include any actual time, such as the time of day, the day of the week, the day of the month, the month of the year, the day of the year, and the year.

Storage device 8 is any storage device for storing a pre-set condition accessible by comparator 10. The pre-set condition is any condition for triggering an action by comparator 10 when the time from timing mechanism 6 meets the condition. For example, the pre-set condition may be a time period between 7:00 AM through 6:00 PM Monday through Friday. In another example, the pre-set condition may be every 55 minutes.

Comparator 10 is any means for comparing the time from timing mechanism 6 with the pre-set condition and preventing the computer peripheral device from being in power save mode when the time from the timing mechanism meets the pre-set condition. For example, comparator 10 may be a general-purpose computer, a computer processing system, a computer processor, or a logical comparator.

Controller 12 is any means for preventing the computer peripheral device from being in power save mode when the time from the timing mechanism meets the pre-set condition. For example, controller 12 may include means for transmitting a job to the peripheral device for processing, means for delivering the wakeup command to the peripheral device, or means for temporarily disabling the power save mode for the peripheral device. Controller 12 may be embodied in any device, such as a general-purpose computer, a computer processing system, a computer processor, or logic circuitry.

Although any print job will reset the timer in power save mode manager 14, when sending a print job just to prevent printer 4 from entering power save mode it is desirable that no paper is actually moved through printer 4. One means for accomplishing a print job without moving paper through the printer is to send a postscript print job without a "showpage" postscript command. An end-of-file marker must also be included in the print job so that printer 4 does not perceive the print job to be incomplete and await a "showpage" command.

In energy star compliant printers, there are two "objects" or "switches" which control the power save mode manager 14. Both of these switches may be controlled by simple network management protocol (SNMP) commands.

The first switch is the "energy-star" switch. The "energy-star" switch controls the length of time printer 4 must be idle before power save mode is entered. On some printers, setting the "energy-star" switch to zero will temporarily disable the power save mode feature. On other printers, the power save mode feature is not disabled by setting this switch to zero.

The other switch is the "sleep-mode" switch. Setting the "sleep-mode" to "on" puts printer 4 into power save mode. Setting the "sleep-mode" to "off" forces printer 4 out of power save mode. However, on some printers the "sleep-mode" switch can only be used to force printer 4 out of power save mode once printer 4 is in power save mode. It cannot be used to prevent printer 4 from entering power save mode.

Additionally, on some printers the "sleep-mode" switch does not reset the idle timer in power save mode manager 14. If printer 4 is forced out of power save mode, the idle timer is not reset and the printer may go back into sleep mode once the still running idle timer reaches the length of time designated in the "energy-star" switch.

Host computer 16 is any computer or computer system locally communicating with printer 4. Printer administrator 18 is any computer system communicating with printer 4. Printer administrator 18 either communicates locally with printer 4 or communicates with printer 4 over a network 20.

Printer 4, host computer 16, and printer administrator 18 may additionally, include a program storage device readable by a computer, tangibly embodying a program, applet, or instructions executable by the computer to carry out instructions or commands necessary for performing the method of the present invention as illustrated below. In one embodiment, the program storage device is embodied in storage device 8. In an alternative embodiment, the program storage device is separate from storage device 8.

Figure 2:
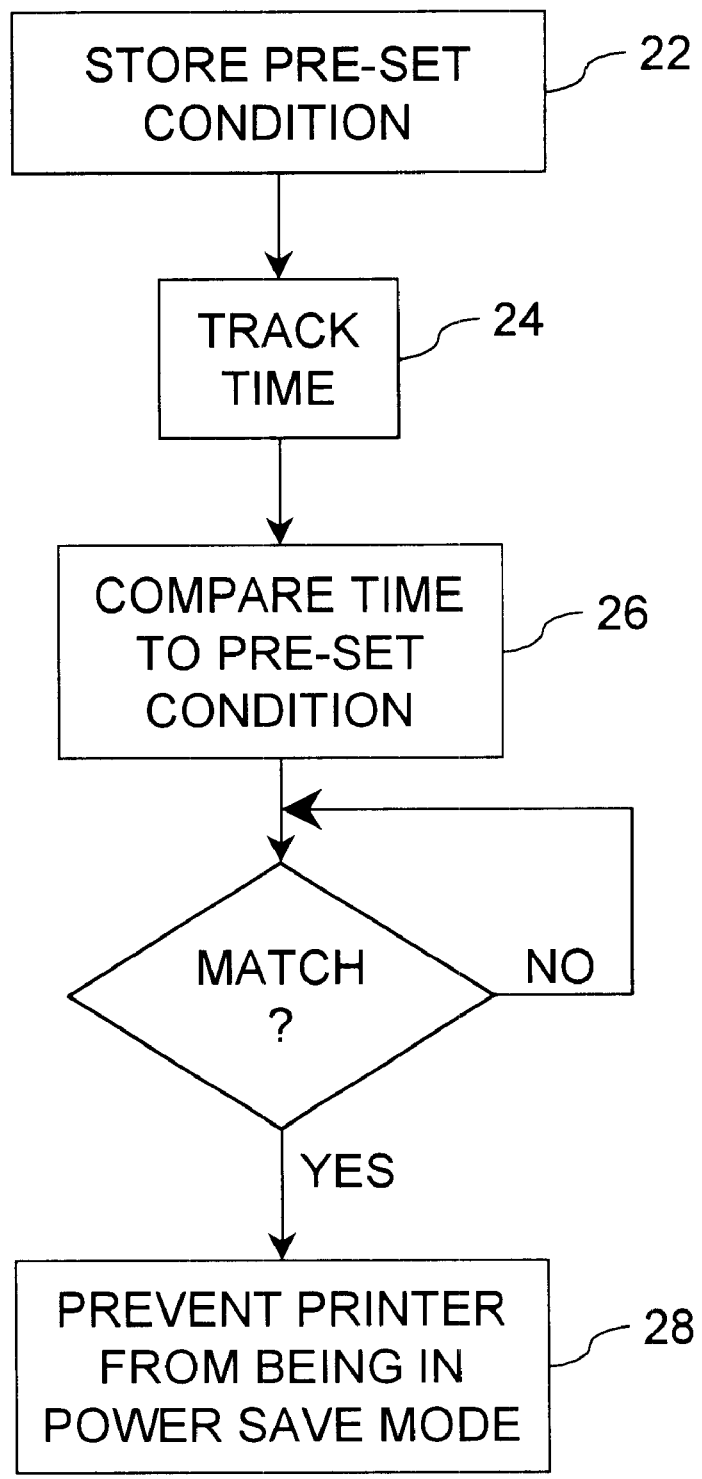
FIG. 2 is a flow chart illustrating one embodiment of the present invention method for preventing a computer peripheral device from being in a power save mode.

Illustrated in FIG. 2 is one embodiment of a method for preventing a computer peripheral device from being in a power save mode. Although FIG. 2 depicts steps of the method in a specific order, the present invention encompasses variations in the timing of the illustrated steps as well as additional steps performed between those steps illustrated.

A pre-set condition is stored 22 in storage device 6. Timing mechanism 6 tracks 22 time. As discussed above, timing mechanism 6 tracks 24 time either as an elapsed time, actual time, or both actual and elapsed time.

The time from timing mechanism 6 is compared 26 to the pre-set condition. If there is no match between the from timing mechanism 6 and the pre-set condition, the method loops until a match is found between the time from timing mechanism 6 and the pre-set condition.

Once a match is found between the time from timing mechanism 6 and the pre-set condition, printer 4 is prevented 28 from being in power save mode. Printer 4 is prevented 28 from being in power save mode by either forcing printer 4 out of power save mode or preventing printer 4 from entering power save mode.

Printer 4 is forced out of power save mode by either transmitting a job to printer 4 for processing, accessing power save mode manager 14 of printer 4 and terminating power save mode, or temporarily disabling the power save mode for printer 4. Printer 4 is prevented from entering power save mode by either transmitting a job to printer 4 for processing or temporarily disabling the power save mode for printer 4.

In one embodiment, the patterns of use for printer 4 are additionally tracked either within or external to printer 4. The patterns of use may include any information related to the use of printer 4. For example, the patterns of use may include average first daily uses, peak times of use, and average times between uses.

The pre-set conditions stored in storage device 8 are then modified to accommodate the patterns of use. For example, if the pre-set condition was to force printer 4 out of power save mode at 8:00 AM each morning and the patterns of use indicate that printer 4 was actually in use by 7:30 AM each morning, the pre-set condition could be modified to force printer 4 out of power save mode at 7:20 AM each morning.

Means for tracking patterns of use for the computer peripheral device and means for modifying the pre-set conditions to accommodate the patterns of use may be located within any of the previously described devices or in a separate device.

It should be understood that the foregoing description is only illustrative of the invention. Various alternatives and modifications can be devised by those skilled in the art without departing from the invention. Accordingly, the present invention is intended to embrace all such alternatives, modifications, and variances that fall within the scope of the appended claims.

What is claimed is:

1. A system for preventing a computer peripheral device from being in a power save mode, the system comprising:

(a) a timing mechanism for tracking time;

(b) a storage device for saving a pre-set condition:

(c) means for comparing the time from the timing mechanism with the pre-set condition;

with the pre-set condition:

(d) means for preventing the computer peripheral device from being in power save mode when the time from the timing mechanism meets the pre-set condition;

(e) means for tracking patterns of use for the computer peripheral device; and, (f) means for modifying the pre-set conditions to accommodate the patterns of use.

2. The system of claim 1 wherein the timing mechanism includes a clock for tracking the actual time.

3. The system of claim 1 wherein the timing mechanism includes a timer for tracking an elapsed time.

4. The system of claim 1 wherein the means for preventing the computer peripheral device from being in power save mode includes means for transmitting a job to the peripheral device for processing.

5. The system of claim 4 further including a network in communication with the peripheral device and wherein the means for transmitting the job to the peripheral device includes means for communicating the job over the network to the peripheral device.

6. The system of claim 1 wherein the peripheral device includes a means for receiving a wakeup command and forcing the peripheral device out of power save mode responsive to the wakeup command and the means for preventing the computer peripheral device from being in power save mode includes means for delivering the wakeup command to the peripheral device.

7. The system of claim 6 further including a network in communication with the peripheral device and wherein the means for delivering the wakeup command to the peripheral device includes means for communicating the wakeup command over the network to the peripheral device.

8. The system of claim 1 wherein the means for preventing the computer peripheral device from being in power save mode includes means for temporarily disabling the power save mode for the peripheral device.

9. A method for preventing a computer peripheral device from being in a power save mode, the method comprising:
   (a) saving a pre-set condition in a storage device;
   (b) tracking time with a timing mechanism;
   (c) comparing the time from the timing mechanism with the preset condition:
   (d) preventing the computer peripheral device from being in power save mode when the time from the timing mechanism meets the pre-set condition;
   (e) tracking patterns of use for the computer peripheral device; and,
   (f) modifying the pre-set conditions to accommodate the patterns of use.

10. The method of claim 9 wherein tracking time includes tracking the actual time.

11. The method of claim 9 wherein tracking time includes tracking an elapsed time.

12. The method of claim 9 wherein preventing the computer peripheral device from being in power save mode includes transmitting a job to the peripheral device for processing.

13. The method of claim 12 wherein transmitting a job to the peripheral device includes communicating the job over a network to the peripheral device.

14. The method of claim 9 wherein the peripheral device includes a means for receiving a wakeup command and forcing the peripheral device out of power save mode responsive to the wakeup command and wherein preventing the computer peripheral device from being in power save mode includes delivering the wakeup command to the peripheral device.

15. The method of claim 14 wherein delivering the wakeup command to the peripheral device includes communicating the wakeup command over a network to the peripheral device.

16. The method of claim 9 wherein preventing the computer peripheral device from being in power save mode includes temporarily disabling the power save mode for the peripheral device.

17. A program storage device readable by a computer, tangibly embodying a program, applet, or instructions executable by the computer to prevent a computer peripheral device from being in a power save mode, the method steps comprising:
   (a) tracking time with a timing mechanism;
   (b) saving a pre-set condition in a storage device:
   (c) comparing the time from the timing mechanism with the preset condition;
   (d) preventing the computer peripheral device from being in power save mode when the time from the timing mechanism meets the pre-set condition;
   (e) tracking patterns of use for the computer peripheral device; and,
   (f) modifying the pre-set conditions to accommodate the patterns of use.

18. The program storage device of claim 17 wherein the step of tracking time with a timing mechanism includes wherein tracking time includes tracking the actual time.

19. The program storage device of claim 17 wherein the step of tracking time with a timing mechanism includes wherein tracking time includes tracking an elapsed time.

20. The program storage device of claim 17 wherein the step of preventing the computer peripheral device from being in power save mode includes transmitting a job to the peripheral device for processing.

21. The program storage device of claim 17 wherein the peripheral device includes a means for receiving a wakeup command and forcing the peripheral device out of power save mode responsive to the wakeup command and wherein the step of preventing the computer peripheral device from being in power save mode includes delivering the wakeup command to the peripheral device.

22. The program storage device of claim 17 wherein the step of preventing the computer peripheral device from being in power save mode includes temporarily disabling the power save mode for the peripheral device.

* * * * *

UNITED STATES PATENT AND TRADEMARK OFFICE
CERTIFICATE OF CORRECTION

PATENT NO.    : 6,594,767 B1
DATED         : July 15, 2003
INVENTOR(S)   : Steve R. Wiley et al.

It is certified that error appears in the above-identified patent and that said Letters Patent is hereby corrected as shown below:

<u>Column 4,</u>
Line 43, delete "condition:" and insert therefor -- condition; --
Line 47, delete "with the pre-set condition:"

Signed and Sealed this

Fourth Day of January, 2005

JON W. DUDAS
*Director of the United States Patent and Trademark Office*